(12) United States Patent
Garcia et al.

(10) Patent No.: US 9,113,405 B2
(45) Date of Patent: Aug. 18, 2015

(54) METHODS AND APPARATUS FOR SUPPORTING MULTIPLE TYPES OF CONNECTIONS TO A CORE NETWORK

(75) Inventors: Luis Garcia, Aalborg (DK); Oumer Teyeb, Stockholm (SE); Simone Redana, Munich (DE); Vinh Van Phan, Oulu (FI); Jeroen Wigard, Klarup (DK); Bernhard Raaf, Neuried (DE)

(73) Assignee: Nokia Solutions and Networks Oy, Espoo (FI)

( * ) Notice: Subject to any disclaimer, the term of this patent is extended or adjusted under 35 U.S.C. 154(b) by 169 days.

(21) Appl. No.: 13/574,882

(22) PCT Filed: Jan. 25, 2010

(86) PCT No.: PCT/EP2010/050802
§ 371 (c)(1),
(2), (4) Date: Oct. 1, 2012

(87) PCT Pub. No.: WO2011/088901
PCT Pub. Date: Jul. 28, 2011

(65) Prior Publication Data
US 2013/0053048 A1 Feb. 28, 2013

(51) Int. Cl.
*H04W 72/00* (2009.01)
*H04W 48/20* (2009.01)
(Continued)

(52) U.S. Cl.
CPC .......... *H04W 48/20* (2013.01); *H04L 12/5692* (2013.01); *H04L 12/66* (2013.01); *H04W 84/045* (2013.01); *H04W 88/10* (2013.01)

(58) Field of Classification Search
CPC . H04W 84/045; H04W 84/105; H04W 72/04; H04W 72/10; H04W 8/186; H04W 48/02; H04W 48/06; H04W 48/20; H04W 88/08; H04W 88/10; H04L 12/66; H04L 12/5692; H04M 2203/2044; H04M 3/42

USPC ............... 455/450–455, 561; 370/329, 338, 370/395.2, 395.21

See application file for complete search history.

(56) References Cited

U.S. PATENT DOCUMENTS

| 2010/0265827 A1* | 10/2010 | Horn et al. ............... 370/241 |
| 2011/0044240 A1* | 2/2011 | Jang et al. ............... 370/328 |
| 2011/0069660 A1* | 3/2011 | Lin et al. ............... 370/328 |

FOREIGN PATENT DOCUMENTS

WO    WO 2009/021246 A1    2/2009

OTHER PUBLICATIONS

TD S2-091573, 3GPP TSG SA WG2 Meeting #71, Feb. 16-20, 2009, Budapest, Hungary, "Admission Control and Rate Control for Hybrid Access Mode", Nortel, 2 pgs.
(Continued)

*Primary Examiner* — Allahyar Kasraian
(74) *Attorney, Agent, or Firm* — Harrington & Smith

(57) ABSTRACT

There is proposed a mechanism providing functions of a so-called hybrid home node B (HHNB) where subscribers, depending on their belonging to a specific subscriber group, such as a closed subscriber group or an open subscriber group, are admitted for a connection to the communication network via different connection routes and systems. After a request for connecting a subscriber is received, an identification process is performed whether the subscriber belongs to a first subscriber group (CSG) or to a second subscriber group (OSG). On the basis of this identification, the subscriber is assigned to a first connection route or a second connection route. It is then checked whether available resources on the assigned connection route are sufficient, wherein on the basis of this check the request for connecting is allowed or rejected.

26 Claims, 5 Drawing Sheets

(51) Int. Cl.
*H04L 12/54* (2013.01)
*H04L 12/66* (2006.01)
*H04W 88/10* (2009.01)
*H04W 84/04* (2009.01)

(56) References Cited

OTHER PUBLICATIONS

TD S2-093096, 3GPP TSG SA WG2 Meeting #73, May 11-15, 2009, Tallinn, Estonia, "Admission Control in Hybrid Mode Due to Shortage of Resource", China Mobile, 2 pgs.

ETSI TS 125 467, V9.1.0 (Jan. 2010), "Universal Mobile Telecommunications System (UMTS); UTRAN Architecture for 3G Home Node B (HNB); Stage 2, (3GPP TS 25.467 version 9.1.0 Release 9)", 34 pgs.

3GPP TS 22.220, V10.0.0 (Sep. 2009), "3$^{rd}$ Generation Partnership Project; Technical Specification Group Services and System Aspects; Service Requirements for Home NodeBs and Home eNodesBs (Release 10)", 22 pgs.

* cited by examiner

METHODS AND APPARATUS FOR SUPPORTING MULTIPLE TYPES OF CONNECTIONS TO A CORE NETWORK

BACKGROUND OF THE INVENTION

1. Field of the Invention

The present invention relates to a method, apparatus and computer program product providing a mechanism for controlling a connection of different types of subscribers to a communication network via different links to a core network. In particular, the present invention is related to a mechanism providing functions of a so-called hybrid home node B (HHNB) where subscribers, depending on their belonging to a specific subscriber group, such as a closed subscriber group or an open subscriber group, are admitted for a connection to the communication network via different connection routes and systems.

2. Related Background Art

Prior art which is related to this technical field can e.g. be found by the technical specifications TS 25.467 (current version: 9.1.0) of the 3GPP.

The following meanings for the abbreviations used in this specification apply:
3GPP—3rd generation partnership project
CSG—closed subscriber group
DeNB—donor eNB
DSL—digital subscriber line
eNB—enhanced node B (Base station)
GAN—generic access network
HHNB—hybrid HNB
HNB—home node B
HNB GW—home node B gateway
IP—Internet protocol
LTE—long term evolution
OSG—open subscriber group
RN—relay node
QoS—quality of service
UE—user equipment
UMA—unlicensed mobile access
WLAN—wireless local area network In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3$^{rd}$ Generation Partnership Project (3GPP), Telecoms & Internet converged Services & Protocols for Advanced Networks (TISPAN), the Internation Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between network elements such as a UE and another communication equipment, such as a database, a server, etc., one or more intermediate network elements, such as network control elements, support nodes, service nodes and interworking elements are involved which may belong to different communication networks.

One approach to further develop telecommunication networks is the installation of so-called low-power base stations, which are also commonly referred to as "femto-cells" or home node B (HNB). Such low-power base stations are advantageous in that they are low-cost and possibly user-deployed cellular base stations using, for example, an IP based wired backhaul, such as cable or DSL, designed to provide service in local environments similar to existing WiFi access points.

Dense deployment of such low-power base stations offers significantly higher capacity per area as compared to macro cells, arising from using smaller cell sizes and more efficient spatial reuse. Femto-cells can be used to provide deep in-building broadband wireless services far more economically than a macro cellular network. Additionally, there can also be considerable savings associated with off-loading traffic onto the femto-cell, in particular for heavy data users.

According to current considerations, as done for example by 3GPP, corresponding low-power base stations (referred to hereinafter as HNBs) may appear like a normal (macro cell) base stations (for example like an eNB) for UEs so that there are no changes necessary in the UEs. The HNBs may provide access to a core network of a network operator, for example, via the Internet. For providing interfaces to the core network via the internet, different access systems can be provided, for example a so-called GAN, also known as UMA, which is chosen by 3GPP as the way to provide the interfacing to the operator's core network.

However, despite the benefits achievable by installing such low-power base stations or HNBs, there may arise also problems which have to be considered for guaranteeing proper functioning of telecommunication networks. For example, issues regarding interference management and efficient system operation are to be considered.

In general, roll-out of femto-cells can be seen as an introduction of an entirely new and unplanned network infrastructure using low-power base stations on top of a carefully planned and coordinated cellular network. For example, in the existing cellular networks, the used base stations are placed in specific locations that minimize the interference among the base stations. Therefore, for ensuring a minimal interference, femto-cells should use a dedicated part of the frequency spectrum so as to completely avoid interference problems, especially at the edges of macro-cells. However, such a solution may not be suitable in practice for several reasons, for example due to the unavailability of extra spectrum or the impossibility to clear-off channels for this purpose. Hence it is likely that femto- and macro-cells will share the same frequency band. In this case, possible capacity and coverage gains can dwindle away, for example due to macro/femto-cell co-channel interference.

Furthermore, other issues have to be considered further. For example, also in view of the fact that low-power base stations may be user-deployed cellular base stations, different aspects with regard to open subscriber groups (OSG) and closed subscriber groups (CSG) have to be considered. While a free-for-all OSG access mode of operation would be more appropriate from a spectrum efficiency point of view, the CSG access mode may be preferable with regard to security, privacy and fair resource distribution of the wired (x-DSL/cable) Internet connection aspects. CSG access mode ensures that only a relatively low number of "known" subscribers (or UEs) belonging for example to company members, friends or family members, can be served by the HNB. Also in view of possible legal consequences, a user running a low-power base station might not wish to share his/her Internet connection with other people, such as neighbors or persons being in the vicinity (and thus the coverage area of the HNB) simply to offload the macro-cell network. Therefore, an access restriction is to be expected.

On the other hand, if such other users are totally unable to access the cellular network via the nearby femto-cell whose signal may be much stronger than that of the (possible) far away macro-cell base station, interference will be a problem.

Furthermore, in case the HNB is linked to the core network by means of wired connections, such as DSL, a further problem may arise due to the capacity of the DSL line which may be lower than that of the link between the UE and the HNB, for example in case of a LTE air interface. Thus, the link between the HNB and the core network may become the bottleneck of such a system. As a result, even if the LTE air interface is not overloaded, congestion might occur on the DSL line affecting all users of the HNB, but also users connected directly to the DSL modem e.g. via Ethernet.

SUMMARY OF THE INVENTION

Thus, it is an object of the invention to provide an apparatus, method and computer program product by means of which a new mechanism for a low-power base station is provided by means of which different kinds of connection for different types of subscribers can be admitted and interference problems can be avoided. In particular, it is an object if the invention to provide a mechanism where, depending on the belonging of a subscriber to a specific subscriber group, such as a closed subscriber group or an open subscriber group, different connection routes or access to the communication network can be controlled. Moreover, it is an object of the invention to provide a corresponding mechanism where load situations at different connection routes can be considered when admitting a subscriber and a more flexible access control is possible.

These objects are achieved by the measures defined in the attached claims.

According to an example of the proposed solution, there is provided, for example, a method comprising receiving a request for connecting a subscriber, identifying whether the subscriber belongs to a first subscriber group or to a second subscriber group, deciding, on the basis of the identified subscriber group of the subscriber, to assign the subscriber to a first connection route or a second connection route, checking available resources on the assigned first or second connection route, and processing the request in accordance with a result of the resource check.

Additionally, according to an example of the proposed solution, there is provided, for example, an apparatus comprising a receiver configured to receive a request for connecting a subscriber, a processor configured to process the request, wherein the processor further comprises an identifier configured to identify whether the subscriber belongs to a first subscriber group or to a second subscriber group, a decider configured to decide, on the basis of the subscriber group of the subscriber identified by the identifier, to assign the subscriber to a first connection route or a second connection route, a detector configured to check available resources on the assigned first or second connection route, and a processing portion configured to process the request in accordance with a result of the resource check of the detector.

According to further refinements, there may be comprised one or more of the following features:

the processing of the request may further comprise one of admitting the subscriber for establishing a connection via the assigned connection route when the result of the resource check indicates sufficient resources on the assigned connection route, or rejecting the request of the subscriber when the result of the resource check does not indicate sufficient resources on the assigned connection route, or checking, when the result of the resource check does not indicate sufficient resources on the assigned convection route, resources on the other of the first or second connection route being different to the assigned connection route, wherein, when the result of the resource check indicates sufficient resources on the other connection route being different to the assigned connection route, there may be further executed a changing of the assignment of the subscriber to the other connection route, and admitting of the subscriber for establishing a connection via the other connection route;

a setup of a downlink path via the assigned connection route may be initialized when the subscriber is admitted;

the first subscriber group may be a closed subscriber group, and the second subscriber group may be an open subscriber group;

the first connection route and the second connection route may comprise a link to the subscriber, wherein the checking of available resources on the assigned first or second connection route may be conducted with regard to the link to the subscriber;

the first connection route may further comprise a link to a core network, which may be based on a femto cell architecture including a wired backhaul, or a link to the core network, which may be based on a relay node architecture including a wireless connection as its backhaul, and the second connection route may comprise the other link to the core network, based on the femto cell architecture or the relay node architecture, which is not used by the first connection route;

the assignment of the first connection route or the second connection route to the subscriber may further comprise a determination of traffic loads on the first connection route and the second connection route, wherein the assignment of the subscriber to the first or second connection route may be executed on the basis of the determined traffic loads;

the assignment of the first connection route or the second connection route to the subscriber may further comprise a determination of a quality of service level to be provided for traffic in a connection to be established for the subscriber, wherein the assignment of the subscriber to the first or second connection route may be executed on the basis of the determined quality of service level;

the assignment of the first connection route or the second connection route to the subscriber may further comprise a determination of a bearer category of a bearer used for a connection of the subscriber, wherein the assignment of the subscriber to the first or second connection route may be executed on the basis of the determined bearer category;

traffic loads on the first connection route and the second connection route may be determined when the subscriber is assigned to the first or second connection route, on the basis of the determined traffic loads, the assignment of the subscriber to the other of the first or second connection route may be changed, and a setup of a downlink path via the changed connection route may be initialized;

the first subscriber group may be given a higher priority than the second subscriber group, wherein, when the subscriber belongs to the second subscriber group, the request for connecting the subscriber may be rejected when the available resources are below a predetermined threshold.

Moreover, according to another example of the proposed solution, there is provided, for example, a computer program product for a computer, comprising software code portions for performing the steps of the above defined method, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a system where low-power base stations can be implemented while a flexible control of accesses of different subscribers can be executed. For example, a corresponding low-power base station, which is also referred to hereinafter as hybrid HNB, admits OSG users to be served via one connection route, which is for example a relay node based link, by means of which a capacity of a link for other users, e.g. CSG subscribers, via another connection route, for example a HNB based link via a wired connection to the network, such as DSL, is not affected (for example, DSL capacity for the CSG users is not impacted). Therefore, CSG users do not feel any restrictions or a deteriorated experience even if OSG users are connected. This can be further improved by giving registered users (CSG users) an absolute QoS priority in detriment of other (OSG) users.

On the other hand, in order to improve the flexibility of the network as a whole, spare capacity on e.g. the DSL line can be used for the traffic of the OSG users, thus reducing the impact on the air interface capacity between the relay node part and the core network.

Additionally, subscribers of e.g. the CSG may also benefit from the proposed solution because the OSG users are not required to connect only to a distant base station, such as a macro eNB, which would cause interference to the HNB cell, especially in the UL direction.

Moreover, since both the CSG and OSG users served by the hybrid HNB share the same cell (i.e., the air interface resources are shared between the two types of users), the capacity of the respective backhaul can be easily shared, and since the hybrid HNB will appear as a normal base station (such as a eNB) to both types of users, a further adaptation of user equipments is not necessary. In other words, the function of the hybrid HNB is completely transparent to the UEs, so that also UEs of earlier releases can share the benefits of this configuration.

In addition, network operators will benefit from the proposed hybrid approach as it is expected to ameliorate the interference problems caused by the uncoordinated deployment of femto-cells. At the same time, there is no penalty to the user's x-DSL/cable Internet access.

Furthermore, the deployment of hybrid HNBs that can also simultaneously act as a relay node will not only make the system more robust to failures due to excessive interference, but it also creates alternatives for load sharing and load switching. Hence, the proposed solution increases also the flexibility of the system with regard to load issues, for example by deciding which connection route is to be used for a subscriber connecting to the hybrid HNB under consideration of load conditions at the respective connection routes (HNB based link or relay node link, i.e. wired or wireless link towards the core network). If one of the connection routes is heavily loaded or even congested, then the other route may be selected. By means of this function, also QoS requirements of the traffic may be considered, in particular for CSG users which may have a higher priority for service. In addition, as a further alternative, when the radio resources from the macro-cell are exhausted or insufficient, there is still a possibility to handover regular (unregistered) users to the hybrid HNB whenever excessive capacity is available (including the DSL backhaul) that will act as a relay node for such UEs.

As a further advantage, it is possible to enhance the interference coordination in the communication network as a whole, for example by enabling the hybrid HNB with the relay node functionality to perform interference coordination between the hybrid HNB and macro base station (the eNB) via the wireless backhaul link. If the wireless backhaul link is active for OSG relay node users, it can also be used to employ interference coordination between CSG HNB users and macro UEs. The same measurements and messages used for interference coordination between relay node served UEs and macro eNB served UEs can be also used for interference coordination between HNB served UEs and macro eNB served UEs.

The above and still further objects, features and advantages of the invention will become more apparent upon referring to the description and the accompanying drawings.

DESCRIPTION OF PREFERRED EMBODIMENTS

In the following, examples and embodiments of the present invention are described with reference to the drawings. For illustrating the present invention, the examples and embodiments will be described in connection with a communication system which may be based on a 3GPP LTE system where different users or subscribers using a respective UE are able to establish a connection with the network by means of different accesses. However, it is to be noted that the present invention is not limited to an application in such a system or environment but is also applicable in other communication systems, connection types and the like.

A basic system architecture of a communication network may comprise a commonly known architecture comprising a wired or wireless access network subsystem and a core network. Such an architecture comprises one or more access network control units, radio access network elements, access service network gateways or base transceiver stations, with which a UE is capable to communicate via one or more channels for transmitting several types of data. Furthermore, core network elements such as gateway network elements, AAA network elements, HSS network elements, policy and charging control network elements and the like are usually comprised. The general functions and interconnections of these elements are known to those skilled in the art and described in corresponding specifications so that a detailed description thereof is omitted herein. However, it is to be noted that there may be provided several additional network elements and signaling links used for a communication connection or a call between UEs and/or servers than those described in detail herein below.

Furthermore, the described network elements, such as gateway elements like a HNB GW, base stations such as a HNB, HHNB, eNB, DeNB etc., network control elements located in the core network, a UE and the like, and their functions described herein may be implemented by software, e.g. by a computer program product for a computer, or by hardware. In any case, for executing their respective functions, correspondingly used devices and network element may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

Figure 1:
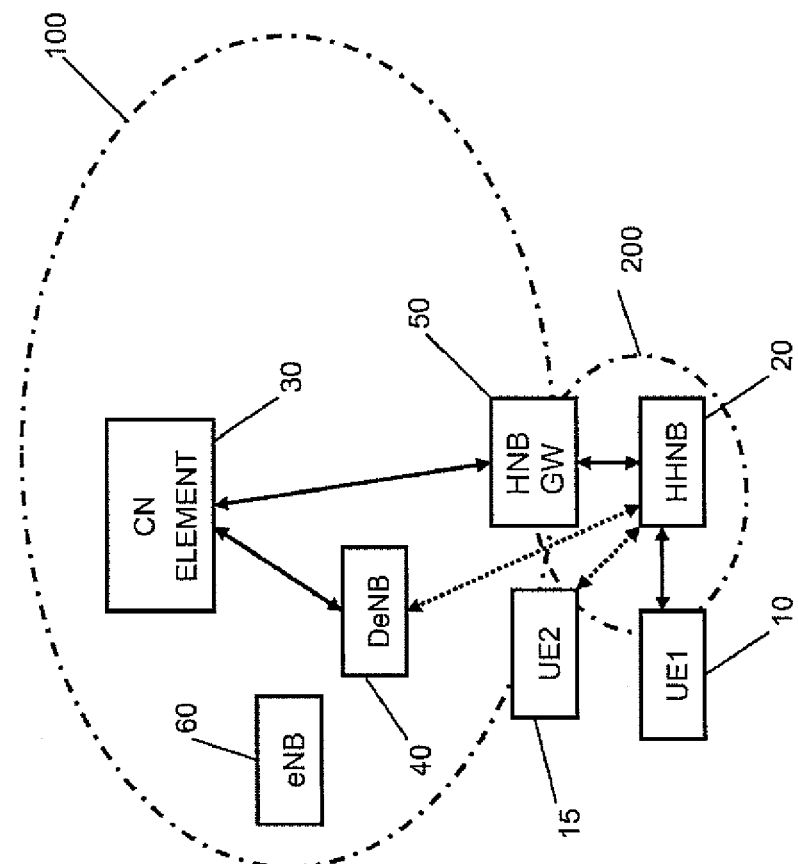
FIG. 1 shows a diagram illustrating an example of a deployment scenario of a low-power base station according to examples of embodiments of the invention in communication network.

In FIG. 1, a simplified architecture of an exemplary communication network is shown in which a low-power base station according to examples of embodiments of the invention (referred to hereinafter as hybrid HNB or HHNB) is implemented for controlling the admission of different subscribers which may belong to different subscriber groups, such as OSG or CSG. The communication network shown in FIG. 1 is based on a 3GPP LTE network architecture.

It is to be noted that the network architecture shown in FIG. 1 depicts only those network elements which are useful for understanding the principles of the examples of embodiments of the invention. As known by those skilled in the art there are several other network elements involved in the establishment, control and management of a communication connection which are omitted here for the sake of simplicity.

Furthermore, with regard to links or interfaces between the network elements shown in FIG. 1, the indications provided in FIG. 1 represent only examples for such links. Other definitions or links providing similar functionality may be also used.

Referring to FIG. 1, reference sign 10 denotes a UE1 of a first subscriber and reference sign 15 denotes a UE2 of a second subscriber. In the following, it is assumed that the first subscriber (i.e. UE1 10) is a registered user and member of a CSG for the HHNB, while the second subscriber (i.e. UE2 15) is an unregistered user and thus only capable to establish a link to the HHNB as an OSG member.

Reference sign 20 denotes a hybrid HNB or HHNB according to examples of embodiments of the invention and representing an example of a low-power base station covering a femto-cell area 200 indicated by a dashed circle. The HHNB 20 provides both functions of a home node B and of a relay node.

In this connection, it is to be noted that as one of the main driving forces behind the deployment of relays is the low infrastructure cost, relay nodes, for example those planned to be used in an LTE-Advanced network, are assumed to be connected to the core network by using in-band (i.e. using the same frequency band as for the HHNB-UE link) or out-band (i.e. using another frequency band as for the HHNB-UE link, the other band however may also be a band where LTE technology is used) wireless backhaul link based on the LTE advanced air interface instead of using wired links or dedicated out-of-band (microwave, HSPA, proprietary systems etc.) wireless links. On the other hand, HNBs may use wired backhaul links to core network. The duplex function of HHNBs according to examples of the invention that can act as HNBs and relay nodes simultaneously is however completely transparent to UEs, so that there is no necessity for modifications of UEs which are to connect to a HHNB so as to enable them to benefit from the duplex functionality (it is to be noted that duplex functionality here should not be confused with duplexing technology like FDD (frequency division duplexing) or TDD (time division duplexing) but refers to the dual connectivity option).

Reference sign 30 denotes a core network or core network (CN) element providing services to users.

Reference signs 40 and 60 denote base transceiver stations, such as eNBs, representing examples of access points for a set of macro cells 100 indicated by a dashed circle (one cell thereof is typically served by one eNB). Specifically, reference sign 40 denotes a DeNB which controls a communication via a relay node (which is part of the HHNB 20) towards the core network, for example via a gateway node (not shown). Reference sign 60, on the other hand, represent a "normal" eNB, for example, which is an alternative entry point for a UE. According to the scenario indicated in FIG. 1, it is assumed that both eNBs 40 and 60 are located at a significant distance to the UEs 10 and 15, i.e. the HHNB is located much nearer to the UEs 10 and 15, resulting in the interference problems indicated above.

Reference sign 50 denotes a HNB GW which is used as a router from the HNB function of the HHNB 20 to and from the core network. The HNB GW 50 appears as a radio network control element to the core network and provides concentrations functions for control plane and user plane with regard to the HHNB 20 (or another HNB (not shown)).

Figure 2:
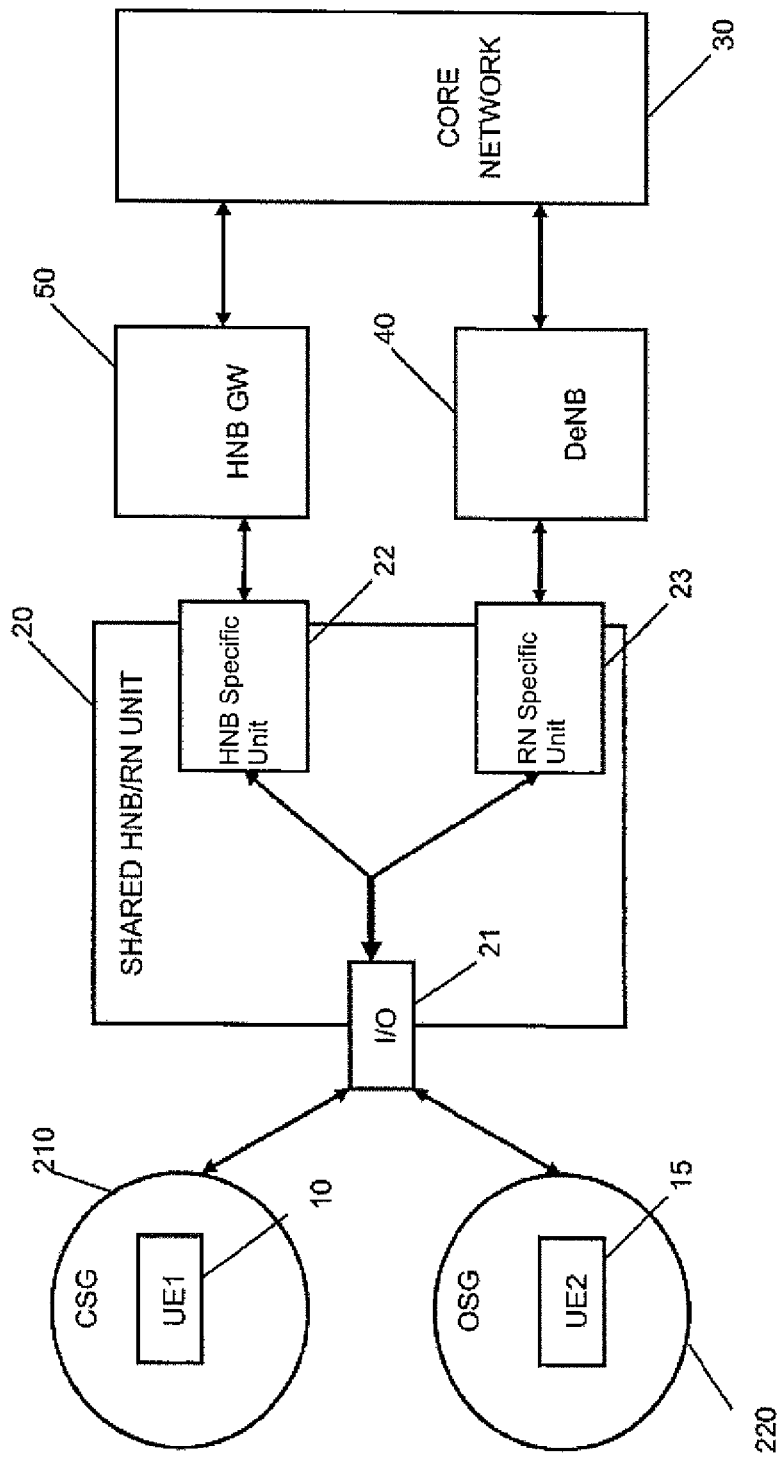
FIG. 2 shows a diagram illustrating details of a configuration of a low-power base station according to examples of embodiments of the invention.

FIG. 2 shows further details of the configuration of the HHNB 20 as well as the links/connections between the respective network elements. In addition to the elements shown in FIG. 1, reference sign 210 indicates a CSG to which the UE1 10 (i.e. its user) belongs, while reference sign 220 indicates a OSG to which the UE2 15 is to be counted (from the viewpoint of the HHNB 20).

It is to be noted that in the example shown in FIG. 2, it is assumed that a UE is connected to either a HNB part or a relay node part, but not both. In other words, the connected to and from the communication network (the core network) is done either via the relay node part or via the HNB part.

With regard to the links between the respective network elements, i.e. the UEs 10, 15, the HHNB 20, the HNB GW 50, the DeNB 40 and the core network 30 (and thus to the services provided thereby), i.e. with regard to the respective interfaces and the backhauls, the UEs 10 and 15 are connected to the HHNB 20 by means of a common interface, for example air interface based on LTE specifications. For receiving/sending signaling from/to the UEs, the HHNB 20 has one or more input/output (I/O) units 21 (air interfaces). The data received from the CSG and OSG UEs 10 and 15 are received at the hybrid HNB via the I/O unit 21 and then routed to a HNB specific part 22 or to a relay node (RN) specific part 23. According to one example of embodiments of the invention, and for facilitating the understanding, it is assumed that a normal operation would be that CSG users are routed towards the HNB part 22 while the OSG users are routed towards the RN part 23.

However, it is to be noted that this routing scheme is only an example and not restrictive. For example, there may be also cases where the routing of CSG and OSG user is the other way around (i.e. OSG users to HNB part or CSG users to RN part), and even a mixed scenario where a mix of OSG and CSG UEs are routed via the RN and HNB parts is possible. The decision where to route a corresponding user (or UE) may depend, for example, on the load conditions in the respective connection routes between the UEs and the HHNB or between the HHNB and the core network, such as a DSL link and the air interfaces.

Referring back to FIG. 2, when the data are routed to the HNB specific part 22, a corresponding connection route towards the core network comprises a link to the HNB GW 50, which is, for example, a wired DSL link or the like (wired backhaul). On the other hand, when the data is routed to the RN specific part 23, a corresponding connection route towards the core network comprises a link to the DeNB 40 (controlling the relay node function of the HHNB 20), which is, for example, a wireless in-band link (wireless backhaul). This wireless link may also include one or more I/O units similar to the I/O unit 21. Alternatively or additionally, it may reuse the I/O unit 21 (e.g. for cost saving), but this is not shown here in order not to obscure the presentation of the routing paths.

From the HNB GW 50 or the DeNB 40, the data are forwarded to the core network by means of a standard connection link, for example.

In the downlink (DL) direction, also assuming that a UE is connected either to the RN or the HNB part but not to both, the operation is straightforward, as the operation from the core network (CN) point of view will be the same as if the UE is connected to a standalone relay node or a standalone HNB. In this context, it is to be noted that when a UE (UE1 10 or UE2 15, for example) connects to the HHNB 20, a decision is made to associate the UE to the HNB part 22 or the RN part 23, a DL path is set accordingly in the network. If the association of a UE is changed later, for example due to varying load conditions in the network requiring a change from the RN part to the HNB part, for example, the path has to be changed accordingly. For example, if congestion occurs in the DSL link of the HNB part 23, and the HHNB 20 decides to relieve the congestion by routing the data of some CSG UEs via the RN part 23, a path switch command may sent towards the core network, either from the RN part 23 or from the controlling DeNB 40 (depending on the relay architecture, i.e., whether relay nodes are visible to the core network or not) to notify it that from there onwards DL data for the concerned UE has to be forwarded towards the relay node part 23 (i.e. via the DeNB 40). For such a path switch command, procedures known from handover control may be used, for example messages used during the handover completion phase (i.e., the HHNB 20 may start a stripped down handover procedure where only handover completion stages may be performed).

With regard to the functions of the HHNB 20, as indicated above, it comprises both functionalities of a "normal" HNB and a "normal" relay node. By means of this, it is in particular useful for controlling admission of different user who may be members of a CSG or are part of an OSG. According to examples of embodiments of the invention, the HHNB 20 operates as a CSG femto-cell, i.e. mainly using wired backhaul, when serving registered (CSG) users. On the other hand, it appears as an OSG relay to all other (OSG) users, thus using the in-band wireless link as its backhaul.

In other words, according to an example of an embodiment of the invention, the HHNB 20 may act like a normal HNB with regard to connection setup and management and act like a normal relay node with regard to the set up of the wireless backhaul link. Thus, different to a conventional HNB, the HHNB 20 according to examples of embodiments of the invention does not only serve CSG users, but may admit also OSG users (if the load conditions allow it, for example).

Furthermore, the HHNB 20 admits OSG users to be served via the relay link, thus not impacting for example a DSL capacity for the CSG users, and thus not compromising their experience. On the other hand, it is possible that spare capacity on the wired link (the DSL line, for example) may also be used for traffic of OSG users, if available and allowed, so that an impact on the air interface capacity may be reduced. The CSG users (i.e. the "normal" HNB users) also benefit from this configuration because, in contrast to conventional systems, the OSG users would not have to connect to a distant eNB (such as eNB 60 of FIG. 1), which may cause interference to the femto-cell, especially in the uplink (UL) direction.

As indicated in FIG. 2, both the CSG and OSG users (UE1 10 or UE2 15) served by the HHNB 20 share the same cell (i.e., the air interface resources are shared between the two types of users), and the HHNB 20 appears like a normal eNB to both types of users, so that no modification in the UEs is necessary.

Figure 3:
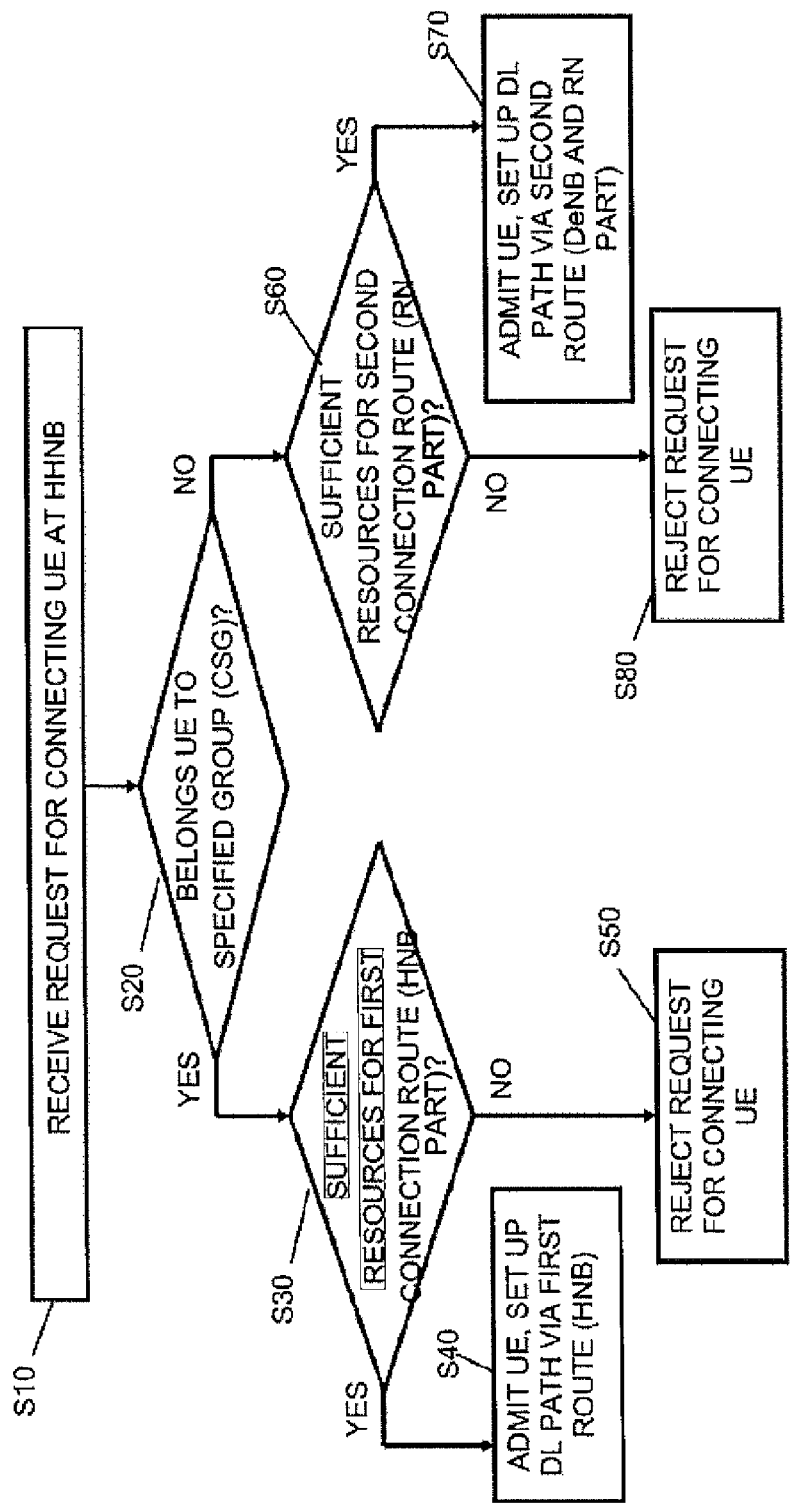
FIG. 3 shows a flow chart illustrating a procedure for controlling admittance of a subscriber according to an example of an embodiment of the invention.

In the following, an example of an embodiment of the invention regarding a mechanism for admission controlling of different users (CSG and OSG users) is described with reference to a flow chart according to FIG. 3. Specifically, FIG. 3 shows a procedure for controlling the admission of a UE for which a connection request is sent towards the HHNB 20, wherein different connection routes are usable for establishing a connection to the core network (i.e. the HNB based connection route and the relay node based connection route using different backhauls). The procedure shown in FIG. 3 may be executed, for example, by the HHNB 20.

In step S10, a request for connecting a UE is received by the HHNB 20. The request may be, for example, a handover request to handover the UE from another base transceiver station (for example a macro-cell eNB) to the HHNB 20, or an initial call setup request at the HHNB 20, or even a request related to cell selection of a UE in idle mode.

With regard to a case where the request for connecting a UE is caused due to a handover decision, a UE that is being served by a macro-cell eNB and comes within the vicinity of the HHNB 20 has sent measurement reports to the macro-cell eNB (e.g. eNB 60 of FIG. 1). The macro-cell eNB 60 has then decided to send a handover request, if the signal towards the HHNB 20 satisfies the handover initiation requirements.

In this connection it is to be noted that sending a request for connecting a UE, e.g. a selection of the HHNB by OSG UEs in the vicinity, may be encouraged or discouraged by tuning cell selection parameters, for example depending on the capacity headroom available at the HNB (or its backhaul).

In step S20, upon receiving the request for connecting the UE, it is checked whether the UE to which the request is related (e.g. UE1 10 or UE2 15), i.e. the subscriber thereof belongs to a specified subscriber group, such as a CSG or not (i.e. OSG). In other words, it is checked whether the UE belongs to a first or a second subscriber group.

If the user happens to be a CSG user (i.e. UE1 10, for example), step S20 is positive and step S30 follows. This means that it is decided to assign the UE to a first connection route (also referred to as assigned connection route). Accordingly, in step S30, an admission control starts which is related to, for example, a HNB admission. In other words, it is checked if sufficient radio resources on the air interface between the HHNB 20 and the UE1 10 are available to accommodate the UE1 10. If the check in step S30 is positive, step S40 is executed where the UE1 10 is admitted and a DL path setup is executed towards the serving gateway (and the core network) so as to set up a transmission of data via the first connection route which then includes the HNB part (wired backhaul, for example). Hence, from this moment onwards, the HNB GW sends DL packets directly towards the HNB, e.g. via the Internet.

Otherwise, in case the check in step S30 is negative, i.e. there are not sufficient resources especially on the air interface, the request for connecting UE1 10 is rejected in step S50.

On the other hand, if it is determined in step 20 that the user does not belong to a CSG (e.g. UE2 15), then a different admission control takes place, for example a RN admission. This means that it is decided to assign the UE to a second connection route. Thus, in a then following step S60, it is checked whether there are sufficient resources on the second connection route. Specifically, it is checked whether the available resources on both the air interface and the wireless backhaul link between the HHNB 20 and the controlling eNB (DeNB 40) that is overseeing the RN functionality of the HHNB 20 are sufficient.

If the necessary resources are determined in step S60 as being available, then step S70 follows where, similar to step S40, the UE2 15 is admitted for a connection via the second connection route (RN part) and the DL path is switched in respective gateways towards the core network, so that data destined to the UE from there onwards will be routed via the DeNB 40, which will then forward it to the relay node part via its wireless backhaul link towards the HHNB 20.

Otherwise, in case the check in step S60 is negative, i.e. there are not sufficient resources, the request for connecting UE2 15 is rejected in step S80.

Figure 4:
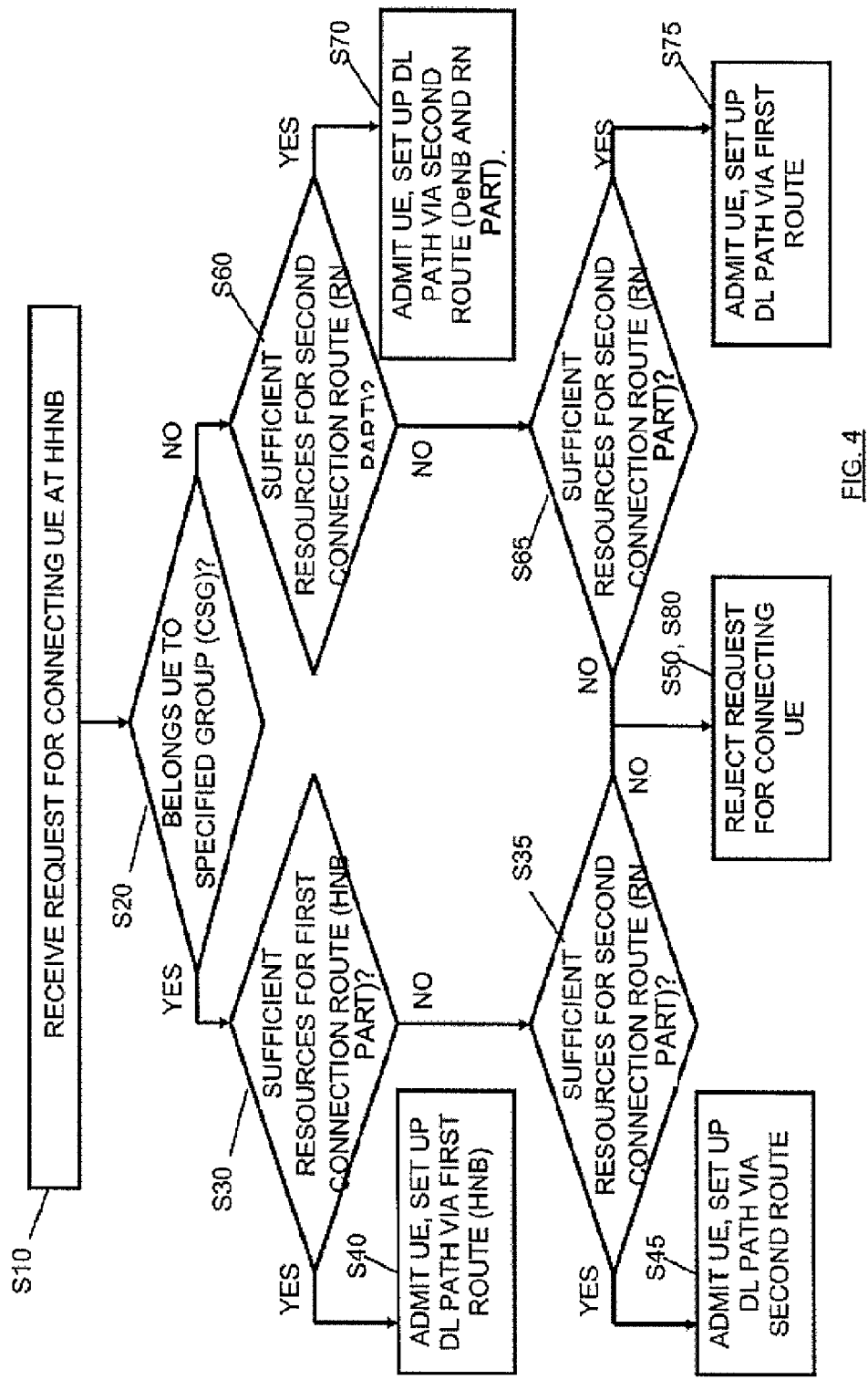
FIG. 4 shows a flow chart illustrating a procedure for controlling admittance of a subscriber according to a further example of an embodiment of the invention.

Next, a further example of an embodiment of the invention regarding a mechanism for admission controlling of different users (CSG and OSG users) is described with reference to a flow chart according to FIG. 4. Specifically, FIG. 4 shows a procedure for controlling the admission of a UE for which a connection request is sent towards the HHNB 20, wherein different connection routes are usable for establishing a connection to the core network (i.e. the HNB based connection route and the relay node based connection route using different backhauls). The procedure shown in FIG. 4 is similar to that described in connection with FIG. 3, so that steps being equivalent to the procedure of FIG. 3 are denoted by the same reference signs and not described in detail again. However, in contrast to the procedure of FIG. 3, the procedure of FIG. 4 considers the possibility to change the assignment of a user to the other connection route (i.e. to change the original connection route which is decided to be assigned to the UE), for example in case the load conditions are such that a connection via the primarily assigned connection route is not suitable. Again, the procedure according to FIG. 4 may be executed, for example, by the HHNB 20.

The procedure according to FIG. 4 comprises also steps S10 to S80 whose functions are basically equivalent to steps S10 to S80, i.e. a corresponding subscriber group check admission control procedure are executed.

Different to the procedure according to FIG. 3, in that of FIG. 4, the check in step S30 may also comprise a check whether the assigned connection route which comprises also the wired backhaul provides sufficient resources. If the result in step S30 indicates, for example, a critical load situation or congestion on the wired backhaul, (NO in step S30) instead of directly rejecting the request for connecting the UE, step S35 is executed where it is checked whether resources on the other connection route (i.e. RN based connection route with wireless backhaul) would suffice the needs for a connection of the UE in question (UE1 10, for example).

If the result of step S35 is positive, then the UE1 10 is admitted for the RN part, i.e. the assignment of the UE1 10 is changed to the second connection route, wherein a corresponding set up of the DL path is also initiated.

Otherwise, in case the result of step S35 is negative, i.e. there are also not sufficient resources on the second connection route, the request is rejected in step S50.

In a similar manner, and also different to the procedure according to FIG. 3, according to the procedure shown in FIG. 4, if the result of the check in step S60 indicates, for example, insufficient resources on the second connection route, especially with regard to the wireless backhaul ling towards the DeNB, (NO in step S60) instead of directly rejecting the request for connecting the UE (UE2 15, for example), step S65 is executed where it is checked whether resources on the other connection route (i.e. HNB based connection route with wired backhaul) would suffice the needs for a connection of the UE in question. In this connection, it may also be checked whether there is an allowance present indicating that it is allowed to switch OSG users to the HNB part at all.

If the result of step S65 is positive, then the UE2 15 is admitted for the HNB part, i.e. the assignment of the UE2 15 is changed to the first connection route, wherein a corresponding set up of the DL path is also initiated.

In this connection, it is to be noted that the decision on step S65, i.e. to switch the OSG user to the HNB part, may also depend on priority values given to the CSG users. This means, for example, that even if there are basically sufficient resources on the HNB part available, if these resources are below, for example, a predetermined threshold, they are only available for CSG users, resulting in an inhibition of a switch of the OSG user to the HNB part, for example.

Otherwise, in case the result of step S65 is also negative, i.e. there are also not sufficient resources on the first connection route (or in case there is no allowance indication for a switch to the HNB part, or priority issues (thresholds) inhibits the change to the HNB part), the request is rejected in step S80.

Figure 5:
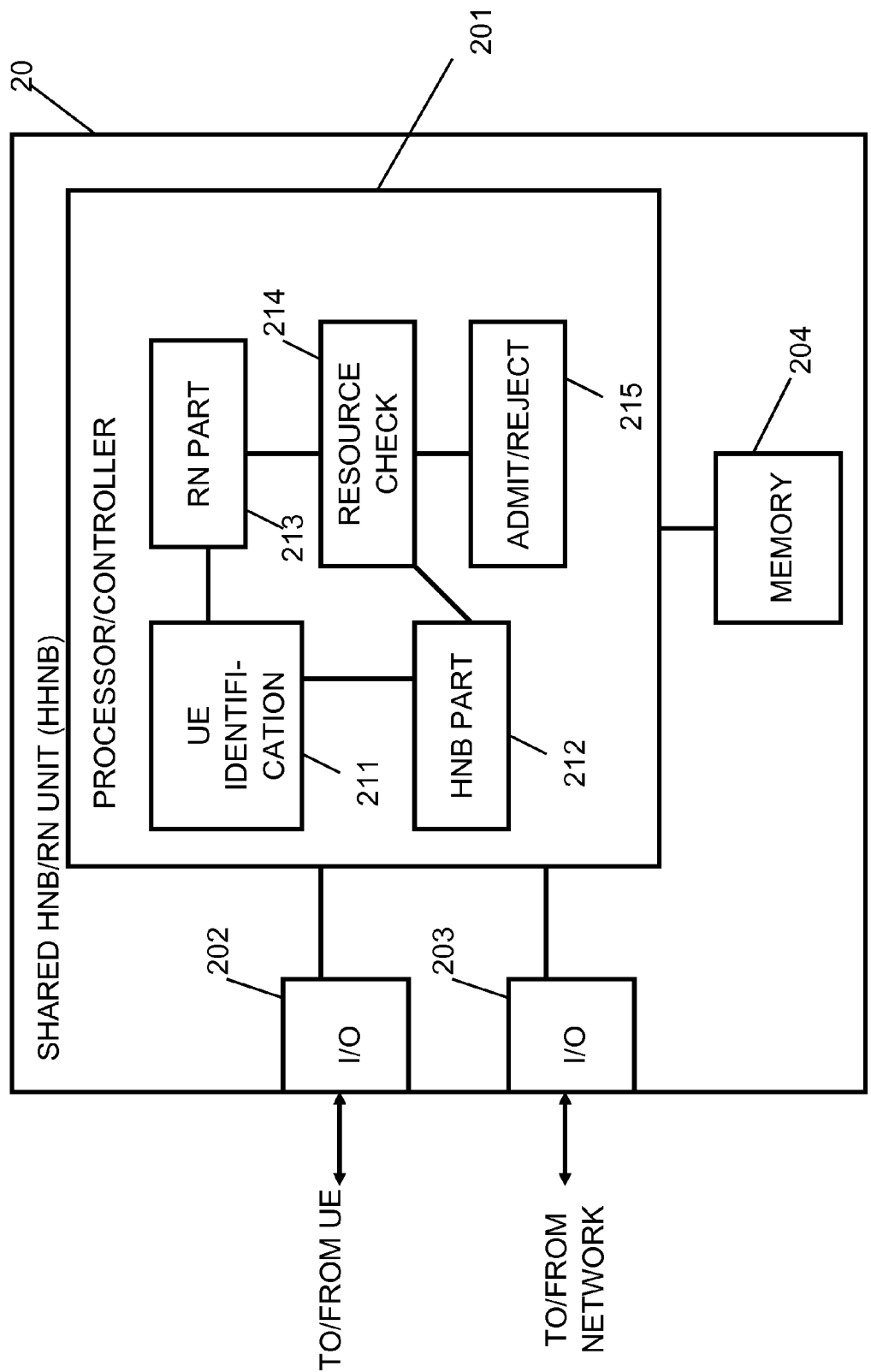
FIG. 5 shows a diagram illustrating a configuration of a network device executing a procedure for controlling admittance of a subscriber according to an example of an embodiment of the invention.

In FIG. 5, a block circuit diagram of a low-power base station network element with shared HNB and relay node functions, such as the HHNB 60, is shown which is configured to implement the admission control described in connection with FIG. 3 or FIG. 4. It is to be noted that the HHNB 20 shown in FIG. 5 may comprise several further elements or functions besides those described in connection therewith but which are omitted herein for the sake of simplicity as they are not essential for understanding the invention.

The HHNB 20 may comprise a processing function or processor 201, such as a CPU or the like, which executes instructions given by programs or the like related to the power control. The processor 201 may comprise further portions dedicated to specific processings described below. Portions for executing such specific processings may be also provided as discrete elements or within one or more further processors, for example. Reference signs 202 and 203 denote transceiver or input/output (I/O) units connected to the processor 201 (or corresponding other elements comprising the functions of the further portions). The I/O unit 202 may be used for communicating with UEs via an air interface. The I/O unit 203 may be used for communicating with other network elements via corresponding interfaces, such as wired interfaces (for the HNB part) and wireless interfaces (for the RN part). The I/O units 202 and 203 may be a combined unit comprising the communication equipment towards all network elements in question, or may comprise a distributed structure with a plurality of different interfaces. Reference sign 204 denotes a memory usable, for example, for storing data and programs to be executed by the processor 201 and/or as a working storage of the processor 201.

The processor 201 is configured to execute processings related to the admission control described in examples of embodiments of the invention. For example, the processor 201 comprises a UE identification portion 211 which identifies to which subscriber group (e.g. CSG, OSG) a UE for which admission is requested belongs. Reference sign 212 denotes a HNB part which functions similar to the HNB specific part 22 shown in FIG. 2, for example. Reference sign 213 denotes a RN part which functions similar to the RN specific part 23 shown in FIG. 2, for example. Reference sign 214 denotes a resource check portion which is capable to determine whether the resources on the respective connection routes (air interfaces, wired/wireless links) are sufficient or not. Reference sign 215 denotes a decision portion which, on the basis of the result of the resource check portion 214, admits or rejects the connecting request. The portion 215 may also determine whether there are further restrictions regarding a connection or a switch of connection of an OSG user to the HNB part, as described above.

In the above described examples of embodiments of the invention, admission control for UEs is mainly executed on the basis of information whether the UE in question belongs to a first (CSG) subscriber group or a second (OSG) subscriber group. According to further examples of embodiments of the invention, it is also possible to perform a more complex optimization where the association with the HNB or RN part is at a bearer level rather than a UE level. A bearer can be considered as a virtual connection between the Core Network (CN) and the UE that is characterized by a set of Quality of Service (QoS) parameters. The traffic belonging to different bearers will be treated according to the QoS parameters of the bearers on the different nodes between the CN and the UE.

According to corresponding examples of embodiments of the invention, additional functionality in the HNB-GW and even the CN may be necessary.

For example, according to a corresponding example of embodiments of the invention, traffic may be routed to the HNB part or RN part not only depending on the type of the user (CSG or OSG), but also on the QoS requirements of the traffic. For example, assuming a situation where only plural CSG users are connected and there is congestion in the wired backhaul (DSL link). Then, according to examples of embodiments of the invention, bearers with strict delay requirements (i.e. bearers of a first category) may be offload to the RN part, while keeping the best effort bearers (i.e. bearers of second category) on the HNB part. The reverse decision may be made also, i.e. best effort bearer are placed on the RN part and strict QoS bearers are kept on the HNB part, if there is no congestion in the wired backhaul but the delay in the RN part is higher.

As a further example, the following scenario may be considered. When it is decided to assign a bearer to a non-primary route and the user admission is decided there (i.e. the admission of that bearer of that user), not only user properties (such as belonging to CSG or OSG) may be taken into account but also bearer properties may be considered.

For example, bearers having a very high priority may be tolerated by the HNB part despite they require and shorten thus DSL-capacity. On the other hand, other bearers (with a lower priority) are not allowed to share resources on the HNB part.

However, in both cases, it is necessary to forward the DL data of a given UE towards multiple paths.

According to an example of an embodiment of the invention, this is accomplished by modifying processing of the HNB GW 50 so that there is no change from a core network point of view (there is still only one path towards the HNB GW for the transmission in the DL direction). Specifically, when the HNB GW receives data to be routed to the UE, the HNB GW either passes it to the HHNB directly via the HNB part if the concerned bearer is associated with the HNB part, or routes it to the DeNB via the core network if the concerned bearer is associated with the RN part.

This approach brings only minimal changes (if any) to the core network. However, it has to be considered that data has to be sent twice in the link between the HNB GW and the core network which may have an impact with regard to the delay and the load.

Thus, according to a further example of an embodiment of the invention, as another approach the core network itself determines to which connection route (HNB part or RN part) a respective bearer is associated. According to this, the transmission path for data is switched at the CN side. In other words, the core network supports multiple DL paths towards a given UE, each associated with a given (set of) bearer(s) which requires corresponding bearer setup and modification procedures to include DL path setup.

With regard to the above described examples of embodiments of the invention, it is to be noted that the proposed HHNB and admission control will ameliorate interference problems caused by the uncoordinated deployment of femtocells so that network operators will benefit from the proposed hybrid approach. At the same time, there is no penalty to users' x-DSL/cable Internet access so that the existing subscribers do not experience any negative effect.

Furthermore, as described above, the deployment of HNBs that can also simultaneously act as relay node will not only make the system more robust to failures due to excessive interference, but it also creates alternatives for load sharing and load switching. That is, when the radio resources from the macro-cell are exhausted or insufficient, there is still a possibility to handover regular (unregistered) users to the HHNB whenever excessive capacity is available (including the DSL backhaul) that will act as relay node for such UEs.

According to further examples of embodiments of the invention, the proposed HHNB also enables the possibility to perform interference coordination between HNB and macro eNB via the wireless backhaul link. If the wireless backhaul link is active for OSG RN users, it can be used also to employ interference coordination between CSG HNB users and macro UEs. The same measurements and messages used for interference coordination between RN served UEs and macro eNB served UEs can be also used for interference coordination between HNB served UEs and macro eNB served UEs.

It is to be noted that during the admission control, both in the RN part and the HNB part, the air interface is involved. As such, according to examples of embodiments of the invention, OSG users are admitted only if they do not compromise the QoS of the already active CSG users in the hybrid HNB cell. A corresponding determination may be effected, for example, in step S60 of FIG. 3 or 4. In other words, not only the bearers with strict QoS requirements such as guaranteed bearers, but also best effort bearers of the CSG users have to be protected. However, according to further examples of embodiments of the invention, a corresponding priority setting may change depending on billing profiles of the HNB owners agreed with the operators.

Furthermore, during admission, it is described in examples of embodiments of the invention that CSG users are assigned to use the HNB functionality while OSG users are associated with RN functionality. However, according to further examples of embodiments of the invention, this may not be the case. For example, in case the Internet link between the HHNB and the HNB GW becomes congested, so that the quality (from UE to the gateways) for the OSG users that are connected to the RN part ends up as being better than for the CSG users, an internal "handover" procedure may be performed. In this internal "handover", which is done transparently to the UE, the DL path is switched from the HNB part to the RN part.

On the other hand, in a situation where there are almost no CGS users, but a flat rate Internet connection, according to further examples of embodiments of the invention, a handover of OSG users may be executed to the HNB part, thus avoiding the overhead on the wireless backhaul link. However, in this scenario, it has to be checked whether the HHNB owner is willing to make his Internet connection available for other's traffic, which may limit such a change. For example, to deal with this problem, operators can come up with incentive plans such as a reduction in total costs of a monthly bill of the HNB owners (and hence the rightful users of the Internet connection) depending on how much traffic they have routed for the sake of the OSG users. Or the operator offers a package that includes all the above, i.e. the user does not have to decide but gets a single option only.

As also indicated above, registered (CSG) users may be provided with an absolute QoS priority in detriment of other users. Thus, according to examples of embodiments of the invention, in case of overload, a forced handover to the macro-cell of the OSG users may be performed in order to free capacity for CSG users.

In order to maintain low complexity and to prevent HNB ping-ponging, according to examples of embodiments of the invention, handovers of registered UEs from a femto-cell to another femto-cell, where such UEs would be treated as unregistered users, may be restricted. This may be useful in particular in dense urban deployments.

As described above, there are restrictions regarding the allowance of admission of unregistered users which may depend, for example, on predetermined thresholds related to the load situation at the respective links/interfaces. Additionally or alternative to corresponding threshold settings, according to examples of embodiments of the invention, a neighboring eNB may send a signal to encourage/discourage OSG admission in the HHNB. For example, eNBs may broadcast a "load sharing request" message, and the HHNBs, upon receiving this message, may activate the RN mode (i.e. allows admission of other users).

According to further examples of embodiments of the invention, the HHNB may also execute the following procedure. While a conventional relay node is supposed to be under the control of the DeNB for radio resource configuration and allocation, the HHNB, depending on ownership and priority whether HNB mode or RN mode comes first, may reclaim a part of committed resources shared between Uu and Un interfaces due to the RN mode. This means that the HHNB may initiate and send a request to the DeNB if the committed resources to the RN part need to be reclaimed to serve CSG users. This is particularly relevant if the HHNB needs these resources to be able to serve CSG users and then routes their traffic towards the wired interface. Then the Un interface to the DeNB may be loaded only extremely lightly or not at all. For a RN this case cannot happen because all the traffic needs to go via the Un interface, but for the HHNB it may be a significant case. In a further example of embodiments of the invention, the connection via the Un interface may be completely suspended at lest temporarily, or switched into a mode where it is only activated intermittently e.g. to maintain a signaling link.

According to further examples of embodiments of the present invention, there is provided a method (and a corresponding apparatus configured to executed a corresponding processing by means of suitable components) comprising receiving a request for connecting a subscriber, identifying whether the subscriber belongs to a closed subscriber group or to an open subscriber group, and deciding, on the basis of the identified subscriber group of the subscriber, to assign the subscriber to a first connection route or a second connection route.

Moreover, according to further examples of embodiments of the present invention, there is provided an apparatus comprising receiving means configured to receive a request for connecting a subscriber, processing means configured to process the request, wherein the processing means further comprises identifying means configured to identify whether the subscriber belongs to a first subscriber group or to a second subscriber group, deciding means configured to decide, on the basis of the subscriber group of the subscriber identified by the identifier, to assign the subscriber to a first connection route or a second connection route, detecting means configured to check available resources on the assigned first or second connection route, and processing means configured to process the request in accordance with a result of the resource check of the detector.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism providing functions of a so-called hybrid home node B (HHNB) where subscribers, depending on their belonging to a specific subscriber group, such as a closed subscriber group or an open subscriber group, are admitted for a connection to the communication network via different connection routes and systems. After a request for connecting a subscriber is received, an identification process is performed whether the subscriber belongs to a first subscriber group (CSG) or to a second subscriber group (OSG). On the basis of this identification, the subscriber is assigned to a first connection route or a second connection route. It is then checked whether available resources on the assigned connection route are sufficient, wherein on the basis of this check the request for connecting is allowed or rejected.

Although the present invention has been described herein before with reference to particular embodiments thereof, the present invention is not limited thereto and various modifications can be made thereto.

The invention claimed is:

1. A method comprising:
   receiving a request for connecting a subscriber,
   identifying whether the subscriber belongs to a first subscriber group or to a second subscriber group based at least in part on a priority value assigned to the subscriber, with a higher priority subscriber being assigned to the first group and a lower priority subscriber being assigned to the second group,
   deciding, based on the identification of the subscriber group to which the subscriber belongs, to assign the subscriber to a first connection route to a core network using a base station configured to act as a home Node B, wherein the base station is a hybrid base station capable of acting as a home Node B or as a relay node, wherein the first connection route provides a connection using a wired backhaul, or a second connection route to the core network, wherein the hybrid base station is configured to act as a relay node, wherein the second connection route provides a connection using a wireless in-band link, wherein a subscriber belonging to the first group is eligible to be assigned to either the first connection route or to the second connection route, and wherein a subscriber belonging to the second group is eligible to be assigned only to the second connection route,
   checking available resources on the assigned first connection route or second connection route, and
   processing the request in accordance with a result of the resource check.

2. The method according to claim 1, wherein the processing of the request further comprises one of
   admitting the subscriber for establishing a connection via the assigned connection route when the result of the resource check indicates sufficient resources on the assigned connection route, or
   rejecting the request of the subscriber when the result of the resource check does not indicate sufficient resources on the assigned connection route, or
   checking, when the result of the resource check does not indicate sufficient resources on the assigned connection route, resources on the other of the first or second connection route being different to the assigned connection route,
   wherein, when the subscriber belongs to the first group and the result of the resource check indicates sufficient resources on the other connection route being different to the assigned connection route, the method further comprises
   changing the assignment of the subscriber to the other connection route, and
   admitting the subscriber for establishing a connection via the other connection route.

3. The method according to claim 2, further comprising initializing a setup of a downlink path via the assigned connection route when the subscriber is admitted.

4. The method according to claim 1, wherein the first subscriber group is a closed subscriber group, and the second subscriber group is an open subscriber group.

5. The method according to claim 1, wherein the first connection route and the second connection route comprises a link to the subscriber, wherein the checking of available resources on the assigned first or second connection route is conducted with regard to the link to the subscriber.

6. The method according to claim 5, wherein the first connection route further comprises a link to a core network, which is based on a femto cell architecture including a wired back-haul, or a link to the core network, which is based on a relay node architecture including a wireless connection as its backhaul, and the second connection route comprises the other link to the core network, based on the femto cell architecture or the relay node architecture, which is not used by the first connection route.

7. The method according to claim 1, wherein assigning of the first connection route or the second connection route to the subscriber further comprises
determining traffic loads on the first connection route and the second connection route, wherein the assignment of the subscriber to the first or second connection route is executed based on the determined traffic loads.

8. The method according to claim 1, wherein assigning of the first connection route or the second connection route to the subscriber further comprises
determining a quality of service level to be provided for traffic in a connection to be established for the subscriber, wherein the assignment of the subscriber to the first or second connection route is executed based on the determined quality of service level.

9. The method according to claim 1, wherein assigning of the first connection route or the second connection route to the subscriber further comprises
determining a bearer category of a bearer used for a connection of the subscriber, wherein the assignment of the subscriber to the first or second connection route is executed based on the determined bearer category.

10. The method according to claim 1, further comprising
determining traffic loads on the first connection route and the second connection route when the subscriber is assigned to the first or second connection route,
when the subscriber belongs to the first group, changing, based on the determined traffic loads, the assignment of the subscriber to the other of the first or second connection route, and
initializing a setup of a downlink path via the changed connection route.

11. The method according to claim 1, further comprising
giving the first subscriber group a higher priority than the second subscriber group, wherein, when the subscriber belongs to the second subscriber group, the request for connecting the subscriber is rejected when the available re-sources are below a predetermined threshold.

12. A non-transitory computer-readable medium storing a program of instructions, execution of which by a processor configures an apparatus to perform the steps of claim 1.

13. The non-transitory computer readable medium of claim 12, wherein said non-transitory computer readable medium comprises an external memory module.

14. The non-transitory computer readable medium of claim 12, wherein said non-transitory computer readable medium comprises internal memory of a computer.

15. An apparatus comprising:
at least one processor;
memory storing a program of instructions;
wherein execution by the at least one processor of the program of instructions stored in the memory causes the apparatus to at least:
in response to receiving a request for connecting a subscriber,
process the request, wherein processing the request further comprises
identifying whether the subscriber belongs to a first subscriber group or to a second subscriber group based at least in part on a priority value assigned to the subscriber, with a higher priority subscriber being assigned to the first group and a lower priority subscriber being assigned to the second group,
deciding, based on the identification of the subscriber group to which the subscriber belongs, to assign the subscriber to a first connection route to a core network using a base station acting as a home node B, wherein the base station is a hybrid base station capable of acting as a home Node B or as a relay node, wherein the first connection route provides a connection using a wired backhaul, or a second connection route to the core network, wherein the base station is acting as a relay node, wherein the second connection route provides a connection using a wireless in-band link, wherein a subscriber belonging to the first group is eligible to be assigned to either the first connection route or to the second connection route, and wherein a subscriber belonging to the second group is eligible to be assigned only to the second connection route,
checking available resources on the assigned first or second connection route, and
processing the request in accordance with a result of the resource check of the detector.

16. The apparatus according to claim 15, wherein the apparatus is further caused to
admit the subscriber for establishing a connection via the assigned connection route when the result of the resource check indicates sufficient resources on the assigned connection route, or
reject the request of the subscriber when the result of the resource check does not indicate sufficient resources on the assigned connection route.

17. The apparatus according to claim 16, wherein the apparatus is further caused to initialize a setup of a downlink path via the assigned connection route when the subscriber is admitted.

18. The apparatus according to claim 15, wherein the apparatus is further caused to initialize the detector to further check, when the result of the resource check by the detector does not indicate sufficient resources on the assigned connection route, resources on the other of the first or second connection route being different to the assigned connection route, wherein, when the result of the resource check indicates sufficient resources on the other connection route being different to the assigned connection route, the apparatus is further caused, when the subscriber belongs to the first group, to change the assignment of the subscriber to the other connection route, and admit the subscriber for establishing a connection via the other connection route.

19. The apparatus according to claim 15, wherein the first subscriber group is a closed subscriber group, and the second subscriber group is an open subscriber group.

20. The apparatus according to claim 15, wherein the apparatus is further caused to provide a link to the subscriber, and to check available resources on the assigned first or second connection route with regard to the link to the subscriber via the communication portion.

21. The apparatus according to claim 20, wherein the apparatus is further caused to establish a connection to a core network using the first connection route if the subscriber belongs to the first group, and to establish a connection to the core network using the second connection route if the subscriber belongs to the second group, wherein the establishing the connection using the first connection route is performed using a femto cell architecture including a wired backhaul, or on a relay node architecture including a wireless connection as its backhaul, and establishing the connection using the first connection route is performed using the other of the femto cell architecture or the relay node architecture, which is not used in establishing the second connection route.

22. The apparatus according to claim 15, wherein the apparatus is further caused to determine traffic loads on the first connection route and the second connection route, and to assign the subscriber to the first or second connection route on the basis of the determined traffic loads.

23. The apparatus according to claim 15, to determine a quality of service level to be provided for traffic in a connection to be established for the subscriber, and to assign the subscriber to the first or second connection route on the basis of the determined quality of service level.

24. The apparatus according to claim 15, wherein the apparatus is further caused to determine a bearer category of a bearer used for a connection of the subscriber, wherein the assignment of the subscriber to the first or second connection route is executed on the basis of the determined bearer category.

25. The apparatus according to claim 15, wherein the apparatus is further caused to determine traffic loads on the first connection route and the second connection route when the subscriber is assigned to the first or second connection route, to change, on the basis of the determined traffic loads, the assignment of the subscriber to the other of the first or second connection route, and to initialize a setup of a downlink path via the changed connection route.

26. The apparatus according to claim 15, wherein the apparatus is further caused to give the first subscriber group a higher priority than the second subscriber group, wherein, when the subscriber belongs to the second subscriber group, and to reject the request for connecting the subscriber when the available resources are below a predetermined threshold.

* * * * *